United States Patent
Kakinuma

(10) Patent No.: US 9,967,434 B2
(45) Date of Patent: May 8, 2018

(54) IMAGE PROCESSING APPARATUS, SYSTEM, METHOD, AND PROGRAM PRODUCT FOR ADJUSTING SATURATION OF A SKIN AREA WHILE MAINTAINING CONVERTED HUE

(71) Applicant: Akihiro Kakinuma, Kanagawa (JP)

(72) Inventor: Akihiro Kakinuma, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days. days.

(21) Appl. No.: 15/105,125

(22) PCT Filed: Dec. 12, 2014

(86) PCT No.: PCT/JP2014/083625
§ 371 (c)(1),
(2) Date: Jun. 16, 2016

(87) PCT Pub. No.: WO2015/122102
PCT Pub. Date: Aug. 20, 2015

(65) Prior Publication Data
US 2016/0323481 A1 Nov. 3, 2016

(30) Foreign Application Priority Data
Feb. 13, 2014 (JP) ................................ 2014-025594

(51) Int. Cl.
*H04N 1/56* (2006.01)
*H04N 1/60* (2006.01)
(Continued)

(52) U.S. Cl.
CPC ............. *H04N 1/6002* (2013.01); *H04N 1/46* (2013.01); *H04N 1/56* (2013.01); *H04N 1/60* (2013.01);
(Continued)

(58) Field of Classification Search
None
See application file for complete search history.

(56) References Cited

U.S. PATENT DOCUMENTS 5,463,470 A * 10/1995 Terashita ............. G03B 27/735
358/520
6,023,524 A * 2/2000 Yamaguchi .......... G03B 27/735
382/162

(Continued)

FOREIGN PATENT DOCUMENTS

JP 2001-251529 9/2001
JP 2004-283357 10/2004
(Continued)

OTHER PUBLICATIONS

International Search Report dated Feb. 10, 2015 in PCT/JP2014/083625 filed on Dec. 12, 2014.
(Continued)

*Primary Examiner* — Scott A Rogers
(74) *Attorney, Agent, or Firm* — IPUSA, PLLC

(57) ABSTRACT

An image processing apparatus includes a skin area extraction unit that extracts a skin area from image data, a chromaticity computation unit that computes hue information and saturation information of the skin area, a hue conversion unit that converts the hue information so that the hue information is in agreement with target information, a reception unit that receives a change instruction to change the saturation information, a parameter determination unit that determines a conversion parameter based on the change instruction, and a saturation conversion unit that converts the saturation information based on the conversion parameter.

7 Claims, 15 Drawing Sheets

(51) Int. Cl.
*H04N 1/62* (2006.01)
*H04N 1/46* (2006.01)

(52) U.S. Cl.
CPC ......... *H04N 1/6027* (2013.01); *H04N 1/6075* (2013.01); *H04N 1/628* (2013.01); *H04N 2201/0094* (2013.01)

(56) References Cited

U.S. PATENT DOCUMENTS

| | | | | |
|---|---|---|---|---|
| 6,408,103 | B1* | 6/2002 | Gallagher | H04N 1/6027 |
| | | | | 348/E5.073 |
| 7,158,667 | B2* | 1/2007 | Kagawa | G06T 11/001 |
| | | | | 348/E9.051 |
| 7,418,129 | B2* | 8/2008 | Komori | H04N 1/60 |
| | | | | 382/162 |
| 7,548,260 | B2* | 6/2009 | Yamaguchi | H04N 1/62 |
| | | | | 348/239 |
| 7,595,920 | B2 | 9/2009 | Kondo et al. | |
| 7,663,788 | B2* | 2/2010 | Kameyama | H04N 1/62 |
| | | | | 358/1.9 |
| 8,103,094 | B2* | 1/2012 | Wilensky | H04N 1/6077 |
| | | | | 348/223.1 |
| 8,248,431 | B2 | 8/2012 | Shirata | |
| 8,379,958 | B2* | 2/2013 | Kaku | G06K 9/00362 |
| | | | | 382/118 |
| 8,605,110 | B2* | 12/2013 | Jang | G09G 5/02 |
| | | | | 345/549 |
| 8,693,049 | B2* | 4/2014 | Kunieda | H04N 1/62 |
| | | | | 348/222.1 |
| 9,070,195 | B2* | 6/2015 | Webb | G06T 5/007 |
| 9,299,168 | B2* | 3/2016 | Ubillos | G09G 5/026 |
| 9,355,466 | B2* | 5/2016 | Kakinuma | H04N 1/6077 |
| 2002/0080379 | A1* | 6/2002 | Iwaki | H04N 1/6005 |
| | | | | 358/1.13 |
| 2007/0127783 | A1 | 6/2007 | Kuramoto et al. | |
| 2009/0201310 | A1* | 8/2009 | Weiss | G06T 11/001 |
| | | | | 345/594 |
| 2009/0323088 | A1* | 12/2009 | Kunieda | H04N 1/62 |
| | | | | 358/1.9 |
| 2010/0158357 | A1* | 6/2010 | Hung | H04N 1/628 |
| | | | | 382/162 |
| 2011/0134328 | A1* | 6/2011 | Tomioka | G06T 1/00 |
| | | | | 348/652 |
| 2013/0135336 | A1 | 5/2013 | Kakinuma | |
| 2015/0332653 | A1* | 11/2015 | Kakinuma | H04N 1/407 |
| | | | | 345/600 |
| 2016/0048949 | A1* | 2/2016 | Peng | H04N 1/628 |
| | | | | 382/162 |
| 2016/0165095 | A1 | 6/2016 | Kakinuma | |

FOREIGN PATENT DOCUMENTS

| | | |
|---|---|---|
| JP | 2005-293231 | 10/2005 |
| JP | 2006-041804 | 2/2006 |
| JP | 2006-180160 | 7/2006 |
| JP | 2006-237808 | 9/2006 |
| JP | 2006-303708 | 11/2006 |
| JP | 2007-158824 | 6/2007 |
| JP | 2009-200900 | 9/2009 |
| JP | 2009-290822 | 12/2009 |
| JP | 2011-142546 | 7/2011 |
| JP | 2013-138407 | 7/2013 |

OTHER PUBLICATIONS

Extended European Search Report dated Jan. 19, 2017.
Korean Office Action for 10-2016-7020439 dated May 29, 2017.

* cited by examiner

301

302

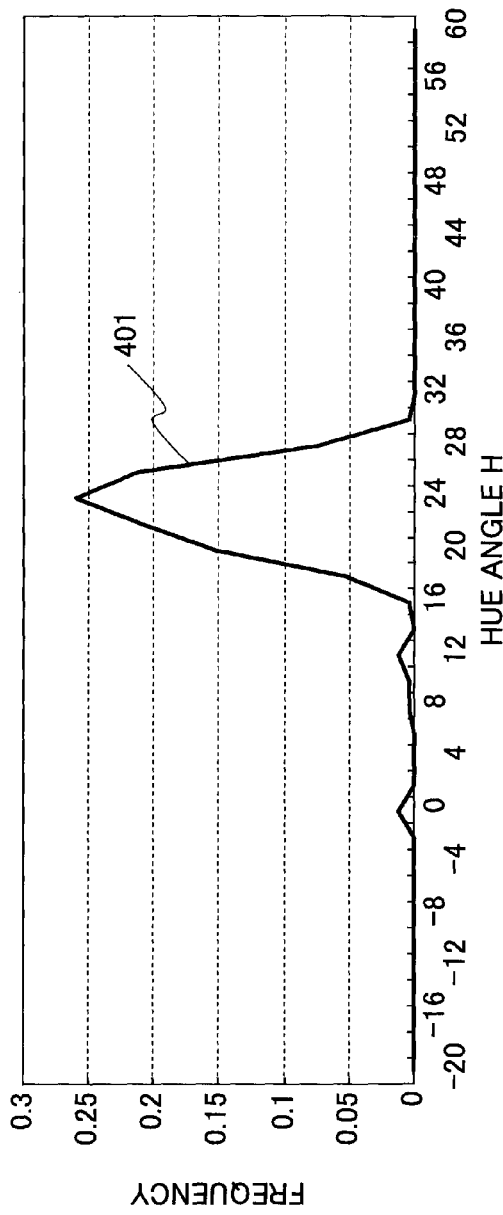
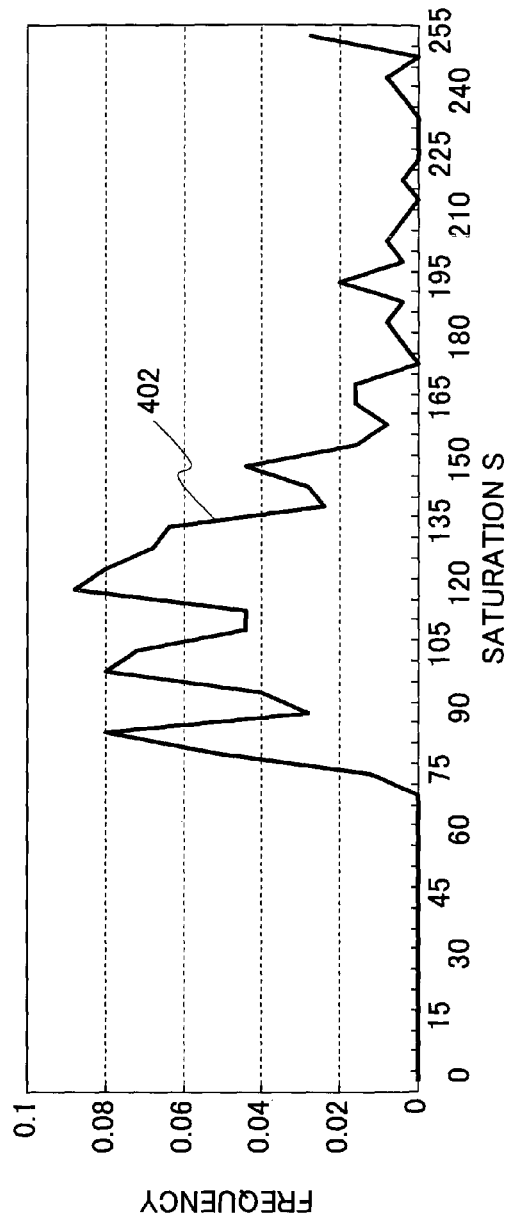
FIG.4A
FIG.4B

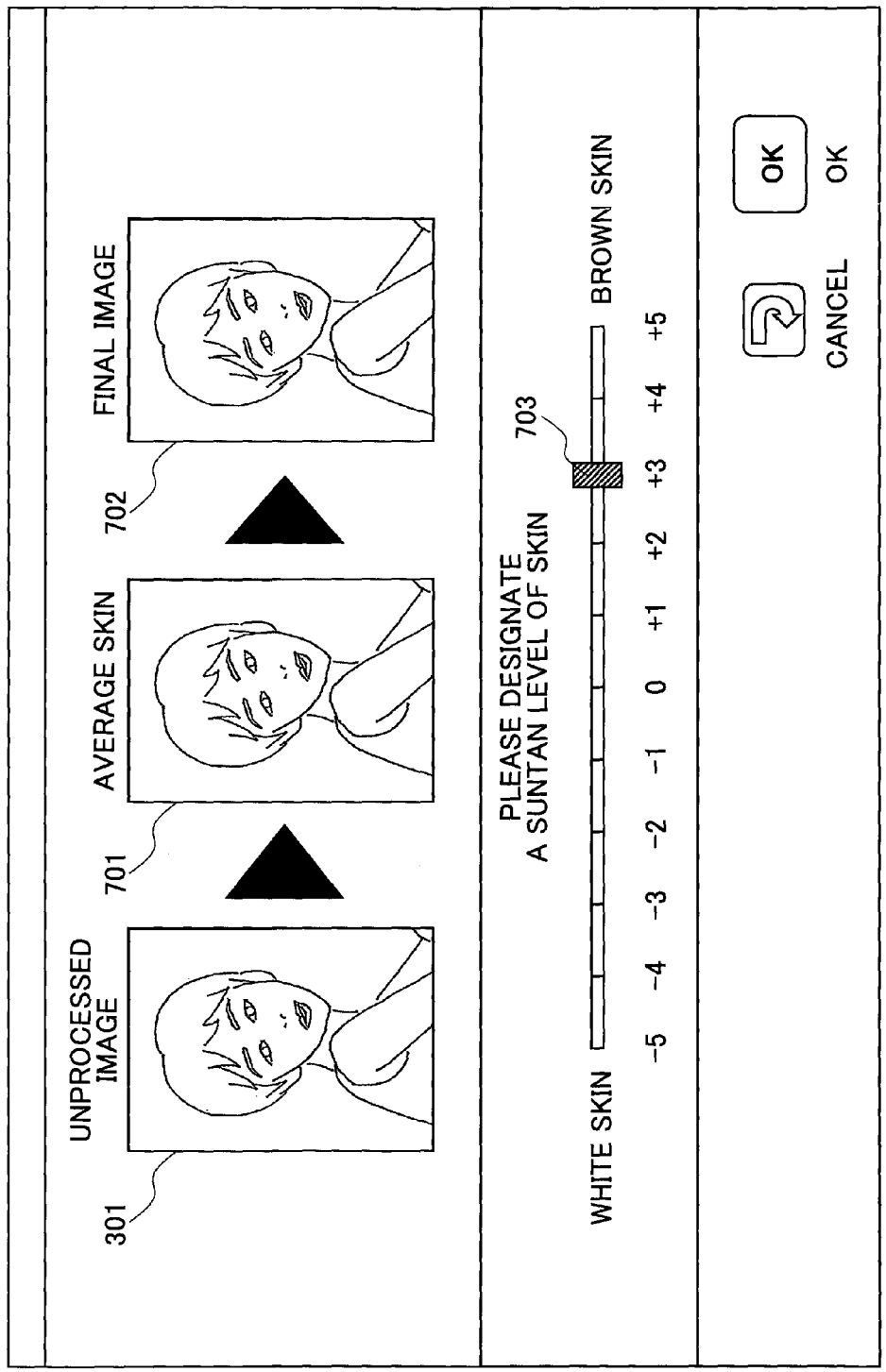

IMAGE PROCESSING APPARATUS, SYSTEM, METHOD, AND PROGRAM PRODUCT FOR ADJUSTING SATURATION OF A SKIN AREA WHILE MAINTAINING CONVERTED HUE

TECHNICAL FIELD

The present invention relates to an image processing apparatus, an image processing system, an image processing method, and a recording medium.

BACKGROUND ART

Many people are accustomed to seeing an image in which a person is a photographic subject. If a color of a person's skin in the image is not properly reproduced, the reproduced image may lead to a sense of incongruity to the viewer. Moreover, in a case where a photograph of a person who wears a red hat or red clothes is taken, the person's skin may look bluish even if the skin color itself is properly reproduced. There is a visual sense characteristic that the skin color does not look proper due to the effect of contrast between the skin color and the background color.

To improve an impression of a person photographed in an image, image processing may be performed so that a person's skin color is changed to a color different from the actual condition. For example, if the color of a woman's skin in the image is made more fair or the color of a man's skin in the image is made more dark, the impression of the person within the image may be changed. In a case of images used for commercial purposes, such as advertisement and promotion, it is demanded to give an impression that a person and goods are suitably fitted to each other. In this case, image processing which adjusts the skin color to such appearance becomes more important. Moreover, in a case of a print market in which photographs are left as important recollections, such as a photograph book, the highest priority matter is to reproduce the skin color so that a person's impression in an image may improve.

An image processing method has been proposed in which color components of pixels of a skin area in an image are acquired using three attributes of brightness, saturation, and hue of the pixels and the color components of the skin area are adjusted to change partially distributions represented by two of the three attributes so that a skin color of a person in an image is adjusted. For example, see Japanese Laid-Open Patent Publication No. 2007-158824.

SUMMARY OF THE INVENTION

Problems to be Solved by the Invention

However, in the image processing method of Japanese Laid-Open Patent Publication No. 2007-158824, what is operated by a user is parameters which represent the skin color in the image, such as brightness, saturation, and hue. It is often difficult for a user who is unfamiliar with the image processing to adjust the parameters and obtain a desired skin color expression. In a case of a skin color, unlike primary colors like red or yellow, the impact of delicate color changes on the viewer is great and adjustment of color tone or saturation is very difficult. Hence, it is difficult for the above-described image processing method to reproduce a user's desired skin color expression with ease.

Moreover, in the image processing method of Japanese Laid-Open Patent Publication No. 2007-158824, image processing may be performed based on predetermined standard hue conversion parameters. However, the degree of freedom of image processing by the user will be lost and the user's desired skin color expression will not necessarily be reproduced.

Accordingly, in view of the above-described problems, the present invention aims at providing an image processing apparatus which reproduces a desired skin color expression with ease.

Means for Solving the Problems

In one aspect, the present invention provides an image processing apparatus which is capable of reproducing a desired skin color expression with ease.

In one embodiment, the present invention provides an image processing apparatus including a memory storing computer readable code that, when executed by a processor, configures the processor as: a skin area extraction unit configured to extract a skin area from image data; a chromaticity computation unit configured to compute hue information and saturation information of the skin area; a hue conversion unit configured to convert the hue information so that the hue information is in agreement with target information; a reception unit configured to receive a change instruction to change the saturation information; a parameter determination unit configured to determine a conversion parameter based on the change instruction; and a saturation conversion unit configured to convert the saturation information based on the conversion parameter.

According to one embodiment of the present invention, it is possible to provide an image processing apparatus which reproduces a desired skin color expression with ease.

Other objects, features and advantages of embodiments will be apparent from the following detailed description when read in conjunction with the accompanying drawings.

BRIEF DESCRIPTION OF THE DRAWINGS

FIGS. 4A and 4B are diagrams showing chromaticity information of a skin area according to the first embodiment.

FIG. 7 is a diagram showing a designation screen in which a suntan level of skin is designated by a user.

MODE FOR CARRYING OUT THE INVENTION

In the following, a description will be given of preferred embodiments with reference to the accompanying drawings.

First Embodiment

Figure 1:
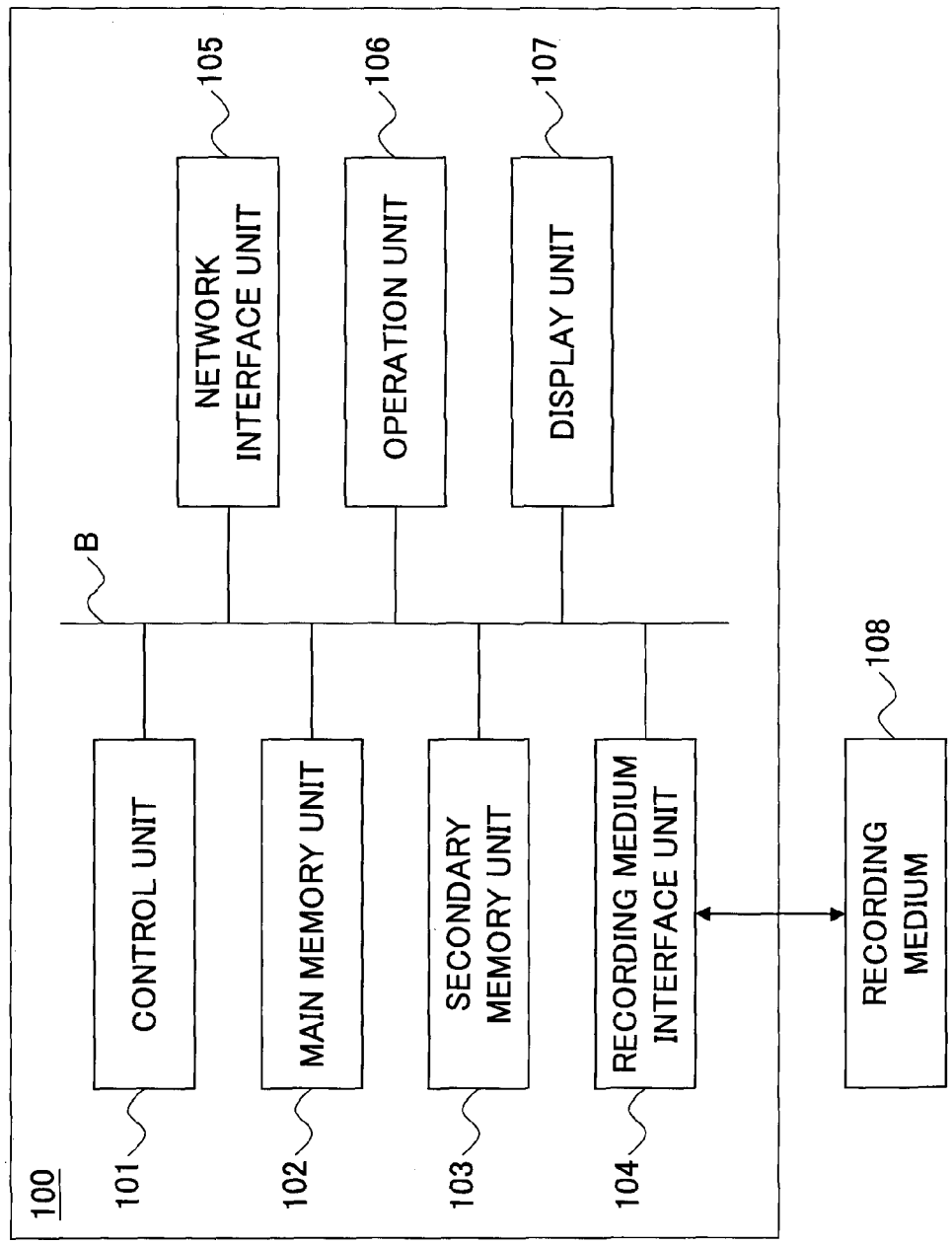
FIG. 1 is a diagram showing a hardware configuration of an image processing apparatus according to a first embodiment.

FIG. 1 shows a hardware configuration of an image processing apparatus 100 according to a first embodiment. As shown in FIG. 1, the image processing apparatus 100 includes a control unit 101, a main memory unit 102, a secondary memory unit 103, a recording medium interface unit 104, a network interface unit 105, an operation unit 106, and a display unit 107, which are interconnected by a bus B.

The control unit 101 may include a CPU (central processing unit) which performs control of the respective units of the image processing apparatus and performs computation and processing of data. The control unit 101 may include a processor which executes a program stored in the main memory unit 102, and the processor receives data from an input unit or a storage unit, performs computation and processing of the data, and outputs the processed data to an output unit or a storage unit.

The main memory unit 102 may include a ROM (read only memory), a RAM (random access memory), etc. In the main memory unit 102, an OS (operating system) as the basic software executed by the control unit 101, application programs and data are stored or temporarily retained.

The secondary memory unit 103 may include a HDD (hard disk drive) or the like. In the secondary memory unit 103, data relevant to the application programs and others are stored.

The recording medium interface unit 104 provides an interface between a recording medium 108, such as a flash memory, and the image processing apparatus 100. For example, by using a data transmission line, such as USB (universal serial bus), the recording medium interface unit 104 is connected to the recording medium 108.

A predetermined program is stored in the recording medium 108, and the recording medium 108 is attached to the image processing apparatus 100. The predetermined program stored in the recording medium 108 is installed in the main memory unit 102 of the image processing apparatus 100 through the recording medium interface unit 104. After the installation, the predetermined program is read from the main memory unit 102 and executed by the control unit 101 of the image processing apparatus 100.

The network interface unit 105 provides an interface between a not-shown peripheral device and the image processing apparatus 100, the peripheral device having a communication function and being connected to the image processing apparatus 100 via a wired or wireless network which is constructed of data transmission lines, such as LAN (local area network) or WAN (wide area network).

The operation unit 106 may include key switches composed of hard keys, a mouse, etc.

The display unit 107 is, for example, an LCD (liquid crystal display), an organic EL (electroluminescence) display, etc. Images, operational icons, etc., are displayed on the display unit 107 and the display unit 107 serves as a user interface for a user to perform various setting processes when using functions of the image processing apparatus 100.

Figure 2:
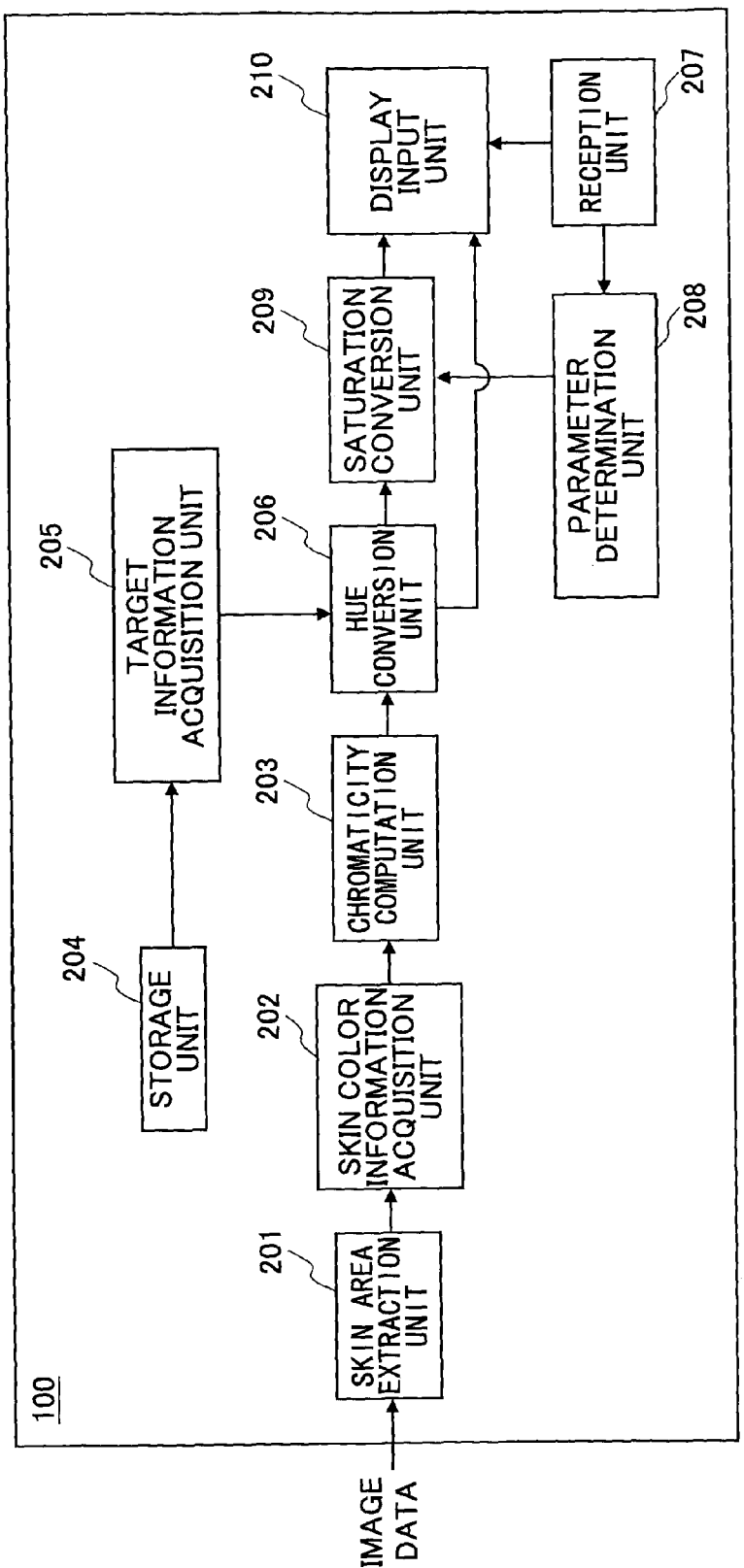
FIG. 2 is a diagram showing a functional configuration of the image processing apparatus according to the first embodiment.

FIG. 2 is a diagram showing a functional configuration of the image processing apparatus 100 according to the first embodiment. As shown in FIG. 2, the image processing apparatus 100 includes a skin area extraction unit 201, a skin color information acquisition unit 202, a chromaticity computation unit 203, a storage unit 204, a target information acquisition unit 205, a hue conversion unit 206, a reception unit 207, a parameter determination unit 208, a saturation conversion unit 209, and a display input unit 210.

The skin area extraction unit 201, the skin color information acquisition unit 202, the chromaticity computation unit 203, the target information acquisition unit 205, the hue conversion unit 206, the parameter determination unit 208, and the saturation conversion unit 209 are functional units of the image processing apparatus 100 implemented by the control unit 101 when executing the program stored in the main memory unit 102 or the like. The storage unit 204 is implemented by the main memory unit 102 and the secondary memory unit 103. The reception unit 207 and the display input unit 210 are functional units of the image processing apparatus 100 implemented by the operation unit 106 and the display unit 107 controlled by the control unit 101.

In the following, the functions of the respective units of the image processing apparatus 100 to perform image processing on input image data will be described with reference to FIGS. 3A through 8B.

<Skin Area Extraction and Skin Color Information Acquisition>

When image data indicating a portrait image (including a person) on which the image processing is to be performed is input to the image processing apparatus 100, the skin area extraction unit 201 extracts a person's skin area from the input image data. In the following, the image data input to the image processing apparatus 100 is called "input image data."

Figure 3A:
FIGS. 3A and 3B are diagrams showing input image data and a skin area according to the first embodiment.
Figure 3B:

FIGS. 3A and 3B are diagrams showing an input image data 301 which is input to the image processing apparatus 100, and a skin area 302 in the input image data 301. FIG. 3A shows the input image data 301, and FIG. 3B shows the skin area 302 (a white portion) extracted from the input image data 301 by the skin area extraction unit 201.

The skin area extraction unit 201 compares color information of the pixels which constitute the input image data 301 with a predetermined skin color threshold, and determines a skin area or a non-skin area for each of the pixels. The determination is made for all the pixels which constitute the input image data 301, and a set of pixels that have been determined as being in the skin area is determined as the skin area 302.

In the example shown in FIG. 3B, the skin area 302 (a white portion) and an area (a black portion) other than the skin area 302 are separated by a clear boundary line. Alternatively, the boundary line between the skin area 302 and the area other than the skin area 302 may be shaded off. Moreover, the degree of shading of the boundary line may be changed according to a location.

After the skin area 302 is extracted from the input image data 301 by the skin area extraction unit 201, the skin color information acquisition unit 202 acquires skin color information of the pixels which constitute the skin area 302.

For example, the skin color information is represented by an 8-bit gradation value (0-255) for each of RGB color components of all the pixels which constitute the skin area 302. However, depending on the image processing environment, various color specification components may be applied. For example, the YUV or YCbCr color system applied to the internal processing of a display or a digital camera may be used instead. Alternatively, when image data is expressed by four color components of CMYK which is used in offset printing, halftone dot ratios of CMYK (%) may be used as the color specification components.

In the image processing apparatus 100 according to the present embodiment, a user may designate a skin area 302 using the operation unit 106, while viewing the input image data 301 which is displayed on the display unit 107. Also in this case, the skin color information acquisition unit 202 acquires the skin color information from the designated skin area 302 similarly.

<Chromaticity Computation>

After the skin color information is acquired from the skin area 302 by the skin color information acquisition unit 202, the chromaticity computation unit 203 performs chromaticity computation based on the skin color information and computes hue histogram information which indicates a frequency distribution of pixels corresponding to a hue angle H in the skin area 302 and saturation histogram information which indicates a frequency distribution of pixels corresponding to a saturation S in the skin area 302. The chromaticity may be determined by selecting an optimal one of color spaces, such as LCH, HSV, etc., according to a working environment. In the present embodiment, the HSV (hue, saturation, value) color space is used.

A frequency in the frequency distribution computed by the chromaticity computation unit 203 is represented by a ratio of the number of pixels corresponding to a certain hue angle H (or a certain saturation S) to the total number of pixels which constitutes the skin area 302. A value of the frequency is in a range between 0 and 1.

FIGS. 4A and 4B are diagrams showing examples of hue histogram information 401 and saturation histogram information 402 of the skin area 302 computed by the chromaticity computation unit 203. FIG. 4A shows the hue histogram information 401, and in FIG. 4A, the lateral axis denotes the hue angle H and the vertical axis denotes the frequency of pixels to the hue angle H. FIG. 4B shows the saturation histogram information 402, and in FIG. 4B, the lateral axis denotes the saturation S and the vertical axis denotes the frequency of pixels to the saturation S.

<Hue Conversion>

Target information which is predetermined as being a target hue histogram is stored in the storage unit 204 of the image processing apparatus 100, and the target information is read from the storage unit 204 by the target information acquisition unit 205.

Figure 5:
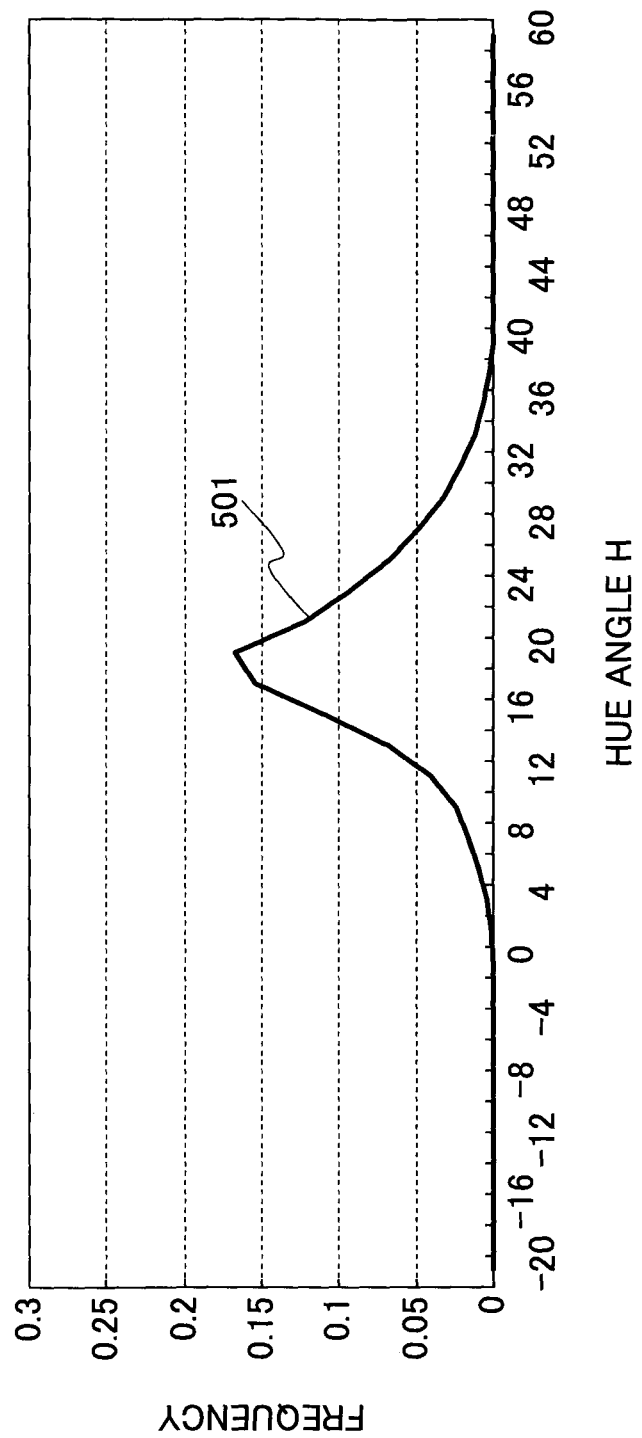
FIG. 5 is a diagram showing target information according to the first embodiment.

FIG. 5 shows an example of the target information 501. Similar to the hue histogram information 401, the target information 501 shown in FIG. 5 indicates a target frequency distribution of pixels corresponding to a hue angle H. In FIG. 5, the lateral axis denotes the hue angle H and the vertical axis denotes the frequency of pixels to the hue angle H.

The target information 501 is hue histogram information of a skin area with which a viewer of a portrait image (including a person) feels with high probability that the skin color reproduction of the person in the image is expressed in an average and comfortable fashion. Such target information 501 is quantitatively determined through the analysis of subjective evaluation results obtained from many test subjects using a plurality of sets of sample image data.

A plurality of target information items may be stored in the storage unit 204. An optimal target information item may be prepared for each of several categories which are classified by race, age or sex. In this case, the target information acquisition unit 205 may recognize a characteristic (race, age or sex) of a person included in the input image data 301 and may acquire selectively a target information item suited for the characteristic from among the target information items stored in the storage unit 204.

After the hue histogram information 401 of the skin area 302 is computed by the chromaticity computation unit 203 and the target information 501 is acquired by the target information acquisition unit 205, the hue conversion unit 206 converts the hue of the skin area 302 based on the target information 501. The hue conversion unit 206 performs a conversion process so that the hue histogram information 401 of the skin area 302 as the object of the conversion is in agreement with the target information 501.

Figure 6A:
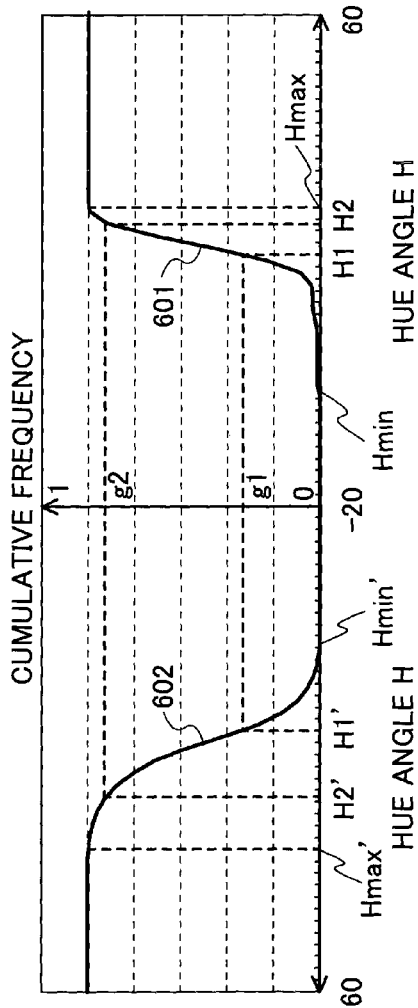
FIGS. 6A and 6B are diagrams showing cumulative frequency distributions of hue information and target information, and a hue conversion table.

FIG. 6A is a diagram for explaining the conversion process performed by the hue conversion unit 206, and shows examples of cumulative frequency distributions of the hue histogram information 401 and the target information 501.

A graph on the right-hand side of FIG. 6A is a cumulative hue histogram 601 in which a cumulative frequency based on the hue histogram information 401 of the skin area 302 as the object of the conversion is taken along the vertical axis. A graph on the left-hand side of FIG. 6A is a cumulative target histogram 602 in which a cumulative frequency based on the target hue histogram information as the target information 501 is taken along the vertical axis and the lateral axis (hue angle H) is reversed. In FIG. 6A, the hue angle H of the cumulative hue histogram 601 (the right-hand side half) increases in the rightward direction, and the hue angle H of the cumulative target histogram 602 (the left-hand side half) increases in the leftward direction. Both the graphs reach the maximum value of 1.

As shown in FIG. 6A, when a cumulative frequency of a hue angle H1 in the cumulative hue histogram 601 is equal to g1, the hue conversion unit 206 is configured to determine a hue angle H1' of the cumulative target histogram 602 corresponding to the cumulative frequency g1 as a hue angle after conversion of the hue angle H1. Similarly, when a cumulative frequency of a hue angle H2 in the cumulative hue histogram 601 is equal to g2, the hue conversion unit 206 is configured to determine a hue angle H2' of the cumulative target histogram 602 corresponding to the cumulative frequency g2 as a hue angle after conversion of the hue angle H2.

In this manner, the hue conversion unit 206 is configured to determine a maximum hue angle Hmax' and a minimum hue angle Hmin' in the cumulative target histogram 602 as a hue angle after conversion of a maximum hue angle Hmax in the cumulative hue histogram 601 and a hue angle after conversion of a minimum hue angle Hmin in the cumulative hue histogram 601, respectively.

Figure 6B:
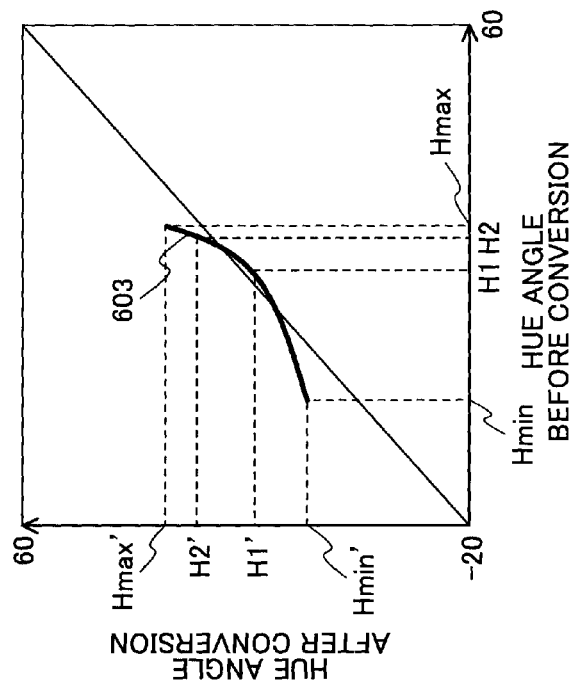

As described above, the hue conversion unit 206 is configured to determine hue angles after conversion in the cumulative target histogram 602 correlated to hue angles before conversion in the cumulative hue histogram 601 based on the correspondence of hue angles to a same cumulative frequency in the cumulative hue histogram 601 and the cumulative target histogram 602, and generate a hue conversion table 603 as shown in FIG. 6B.

As shown in FIG. 6B, the lateral axis in the hue conversion table 603 denotes a hue angle before conversion, and the vertical axis in the hue conversion table 603 denotes a corresponding hue angle after conversion. The hue conversion unit 206 is configured to convert the hue angles H of all the pixels which constitute the skin area 302 in the input image data 301 into the hue angles H' based on the hue conversion table 603. In the following, an image in which the hue angles H of the skin area 302 have been converted is called "image data after hue conversion."

In the image processing apparatus 100 according to the present embodiment, the hue conversion of the input image data 301 does not require a user to perform a complicated parameter operation and the image data of the skin area 302 in the input image data 301 may be converted to have the average color tone which does not lead to a sense of incongruity to the viewer.

<Determination of Saturation Conversion Parameter>

After the hue conversion of the skin area 302 is performed by the hue conversion unit 206 and the image data after the hue conversion is generated, the display input unit 210 displays the input image data 301 and the image data after the hue conversion on the display unit 107.

FIG. 7 shows an example of a designation screen which includes the input image data 301, image data 701 after the hue conversion, image data 702 after saturation conversion, and a slide bar 703 for allowing a user to designate a suntan level of skin.

As shown in FIG. 7, the display input unit 210 displays, on the display unit 107, the input image data 301 at an upper-row left-hand portion of the screen, the image data 701 after the hue conversion at an upper-row middle portion of the screen, and the image data 702 after the saturation conversion at an upper-row right-hand portion of the screen. The image data 701 after the hue conversion and the image data 702 after the saturation conversion are displayed after color space conversion of these image data from HSV chromaticity information to RGB gradation information is performed.

In a middle row of the screen, the slide bar 703 for receiving a user's designation of a suntan level of skin of a person contained in the image is displayed. In the example shown in FIG. 7, if the slide bar 703 is moved leftward, the person's skin color in the image continuously changes to white skin in which suntan is suppressed, and if the slide bar 703 is moved rightward, the person's skin color in the image continuously changes to a brown skin in which the skin is tanned well.

In the image data 702 after the saturation conversion displayed on the screen, the result of image conversion processing (which will be described later) which is performed according to a position of the slide bar 703 is reflected in real time. The user designates a desired suntan level of the skin by moving the slide bar 703 displayed on the screen rightward or leftward with the operation unit 106, such as a mouse, while checking a final image. After an "OK" button at a lower row of the screen is clicked, the designation of the suntan level by the user is determined. To redo the designation of the suntan level, a "CANCEL" button at the lower row of the screen is clicked so that the user designation is again possible.

If the user moves the slide bar 703 and designates a suntan level, the reception unit 207 receives the designated suntan level and the parameter determination unit 208 determines a saturation conversion parameter based on the received suntan level. In the example shown in FIG. 7, a suntan level of skin ranging from a minimum value (−5) to a maximum value (+5) and centered on zero may be designated by operating the slide bar 703. For example, the parameter determination unit 208 is configured to determine a saturation conversion parameter linearly based on the received suntan level so that the saturation conversion parameter is set to "1" when the received suntan level is zero, set to "0.5" when the received suntan level is the minimum value (−5), and set to "1.5" when the received suntan level is the maximum value (+5). In this embodiment, the parameter determination unit 208 is configured to determine a saturation conversion parameter k in accordance with a conversion formula: k=(1+0.1L) where L denotes the suntan level.

The range of the suntan level L is not limited to the range between −5 and +5 as in the present embodiment. The values of the suntan level L may be set up in an arbitrary range of numerical values with an arbitrary step size. Alternatively, the designation screen may be provided with a numeric input field which is configured so that a user may directly input a value of the suntan level L or a value of the saturation conversion parameter k. Moreover, the method of determining the saturation conversion parameter k used by the parameter determination unit 208 is not limited to the present embodiment. Alternatively, the saturation conversion parameter k may be set up in an arbitrary range of numeric values by using a different conversion formula.

After the saturation conversion parameter k is determined by the parameter determination unit 208, the saturation conversion unit 209 converts the saturation of the skin area 302 of the input image data 301 based on the saturation conversion parameter k.

<Saturation Conversion Process>

Using any one of some saturation conversion table generation methods which will be explained below, the saturation conversion unit 209 generates a saturation conversion table and converts the saturation of the skin area 302 of the input image data 301 based on the generated saturation conversion table.

Figure 8A:
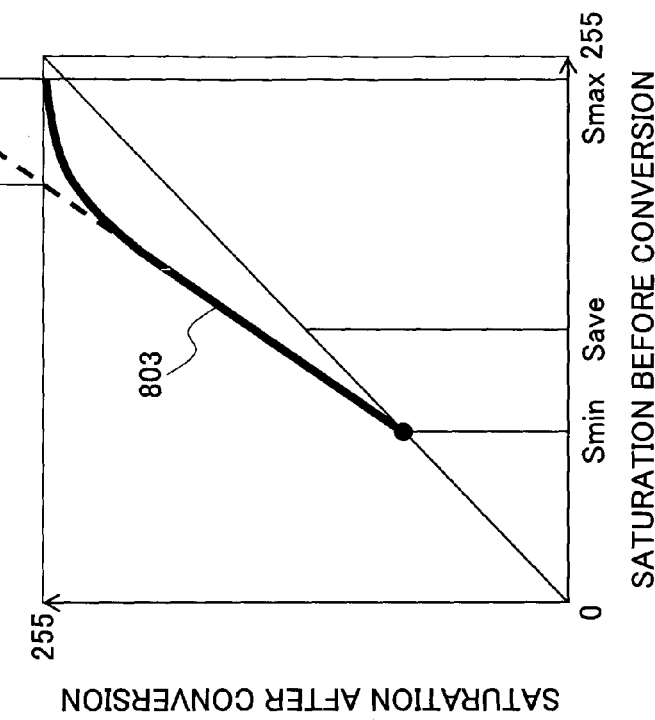
FIGS. 8A and 8B are diagrams showing examples of a saturation conversion table according to the first embodiment.

FIG. 8A is a diagram showing an example of a saturation conversion table 801 which is generated based on the saturation conversion parameter k by the saturation conversion unit 209. In the graph indicated in FIG. 8A, the lateral axis denotes the saturation before conversion and the vertical axis denotes the saturation after conversion.

In the example of FIG. 8A, "Save" denotes an average value of the saturations S of all the pixels which constitute the skin area 302, "Smin" denotes a minimum value of the saturation S, and "Smax" denotes a maximum value of the saturation S. The saturation conversion table 801 is determined based on a straight line with a gradient equal to the saturation conversion parameter k by assuming that the average saturation value "Save" is a saturation invariant point. The saturation conversion table 801 shown in FIG. 8A is an example of the saturation conversion table 801 when the saturation conversion parameter k is equal to 1.5.

As shown in FIG. 8A, when the saturation conversion parameter k is greater than 1, the saturation after conversion corresponding to a high saturation area 802 indicated by a dotted line in FIG. 8A becomes greater than a maximum saturation value (255) which is an upper limit of the saturation after conversion. To avoid this, as indicated by a solid line in FIG. 8A, the saturation conversion table 801 is set up so that the saturation after conversion in the high saturation area converges to the maximum saturation value. Similarly, when the saturation after conversion corresponding to a low saturation area is less than a minimum saturation value (0)

which is a lower limit of the saturation after conversion, the saturation conversion table 801 is set up (not shown) so that the saturation after conversion corresponding to the low saturation area converges to 0.

Figure 8B:
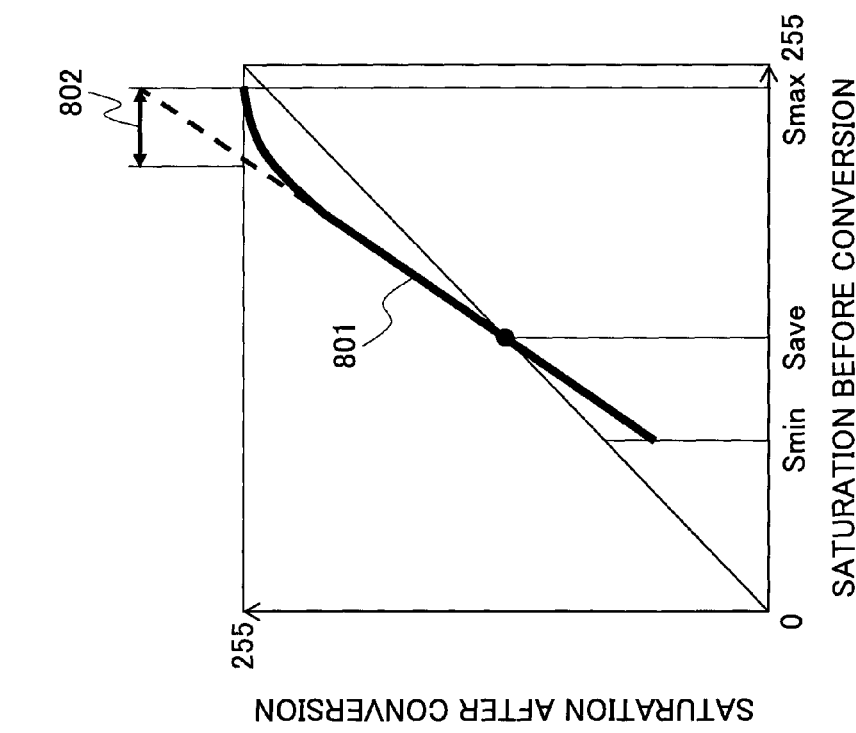

FIG. 8B is a diagram showing an example of a saturation conversion table 803 which is generated based on the saturation conversion parameter k by the saturation conversion unit 209. In the graph indicated in FIG. 8B, the lateral axis denotes the saturation before conversion and the vertical axis denotes the saturation after conversion.

In the example of FIG. 8B, "Save" denotes an average value of the saturations S of all the pixels which constitute the skin area 302, "Smin" denotes a minimum value of the saturation S, and "Smax" denotes a maximum value of the saturation S. The saturation conversion table 803 is determined based on a straight line with a gradient equal to the saturation conversion parameter k by assuming that the minimum saturation value "Smin" is a saturation invariant point. The saturation conversion table 803 shown in FIG. 8B is an example of the saturation conversion table 803 when the saturation conversion parameter k is equal to 1.5.

As shown in FIG. 8B, when the saturation conversion parameter k is greater than 1, the saturation after conversion corresponding to a high saturation area 804 indicated by a dotted line in FIG. 8B becomes greater than the maximum saturation value (255) which is the upper limit of the saturation after conversion. To avoid this, as indicated by a solid inner in FIG. 8B, the saturation conversion table 803 is set up so that the saturation after conversion in the high saturation area converges to the maximum saturation value. Similarly, when the saturation after conversion corresponding to the low saturation area is less than the minimum saturation value (0) which is the lower limit of the saturation after conversion, the saturation conversion table 803 is set up (not shown) so that the saturation after conversion corresponding to the low saturation area converges to 0.

As described above, the saturation conversion unit 209 is configured to generate a saturation conversion table based on a straight line with a gradient equal to the saturation conversion parameter k by assuming that the average saturation value "Save" or the minimum saturation value "Smin" is a saturation invariant point.

Regardless of whether the saturation invariant point is the average saturation value "Save" or the minimum saturation value "Smin", the suntan level of the skin designated by the user may be expressed properly. If the minimum saturation value "Smin" is assumed to be the saturation invariant point, it becomes possible to vary the saturation uniformly from a highlight portion to a shadow portion of the skin area 302. If the average saturation value "Save" is assumed to be the saturation invariant point, it becomes possible to suppress skin color fluctuation of a portion of the skin area 302 whose saturation is not high like a highlight portion and not low like a shadow portion.

Furthermore, the saturation conversion unit 209 may be configured to generate a saturation conversion table by the following method.

Assume that "Smin" and "Smax" denote a minimum saturation value and a maximum saturation value of the saturations S of all the pixels which constitute the skin area 302, "Smin'" denotes a minimum saturation target value which is a conversion target value of the minimum saturation value "Smin", and "Smax'" denotes a maximum saturation target value which is a conversion target value of the maximum saturation value "Smax".

When the saturation conversion parameter k is less than 1 (k<1), the saturation conversion unit 209 computes a minimum saturation target value "Smin'" and a maximum saturation target value "Smax'" in accordance with the following formula (1).

$$k<1: Smin'=k' Smin, Smax'=k \cdot Smax \quad (1)$$

When the saturation conversion parameter k is greater than or equal to 1 (k≥1), the saturation conversion unit 209 computes a minimum saturation target value "Smin'" and a maximum saturation target value "Smax'" in accordance with the following formula (2).

$$k \geq 1: Smin'=Smin/k, Smax'=k \cdot Smax \quad (2)$$

Figure 9A:
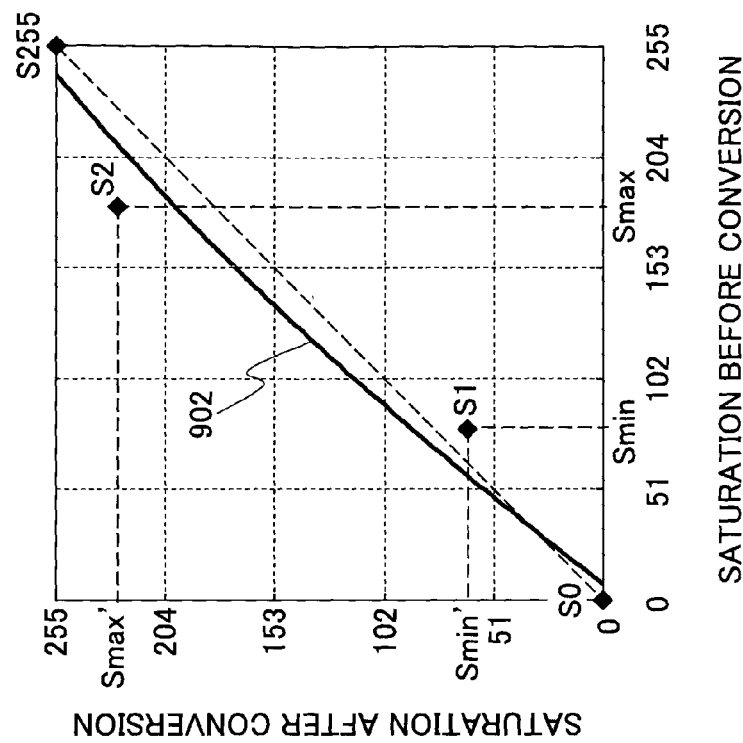
FIGS. 9A and 9B are diagrams showing examples of a saturation conversion table according to the first embodiment.
Figure 9B:
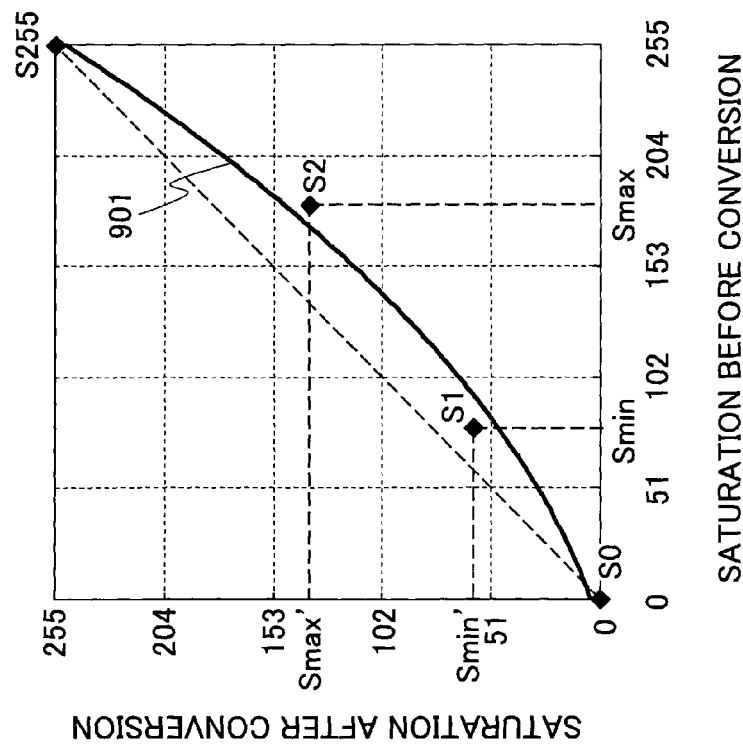

FIGS. 9A and 9B are diagrams showing examples of saturation conversion tables 901 and 902 which are generated based on the minimum saturation target value "Smin'" and the maximum saturation target value "Smax'" which are generated based on the minimum saturation value "Smin", the maximum saturation value "Smax", and the above formulas (1) and (2) by the saturation conversion unit 209. FIG. 9A shows the saturation conversion table 901 generated when the saturation conversion parameter k is less than 1, and FIG. 9B shows the saturation conversion table 902 generated when the saturation conversion parameter k is greater than or equal to 1.

As shown in FIGS. 9A and 9B, in the coordinates in which the lateral axis denotes the saturation before conversion and the vertical axis denotes the saturation after conversion, the saturation conversion unit 209 is configured to compute an approximate curve of a quadratic function based on four points consisting of a minimum saturation point S1 (Smin, Smin'), a maximum saturation point S2 (Smax, Smax'), an achromatic point S0 (0, 0), and a highest saturation point S255 (255,255), and generate a saturation conversion table correlated to the skin area 302 based on the computed approximate curve.

The saturation conversion table 901 shown in FIG. 9A is an example of the saturation conversion table when the user designates the suntan level (k<1) to cause the color of the skin area 302 to approach white skin, and the curve of the saturation conversion table 901 has a downwardly convex shape.

Figure 10A:
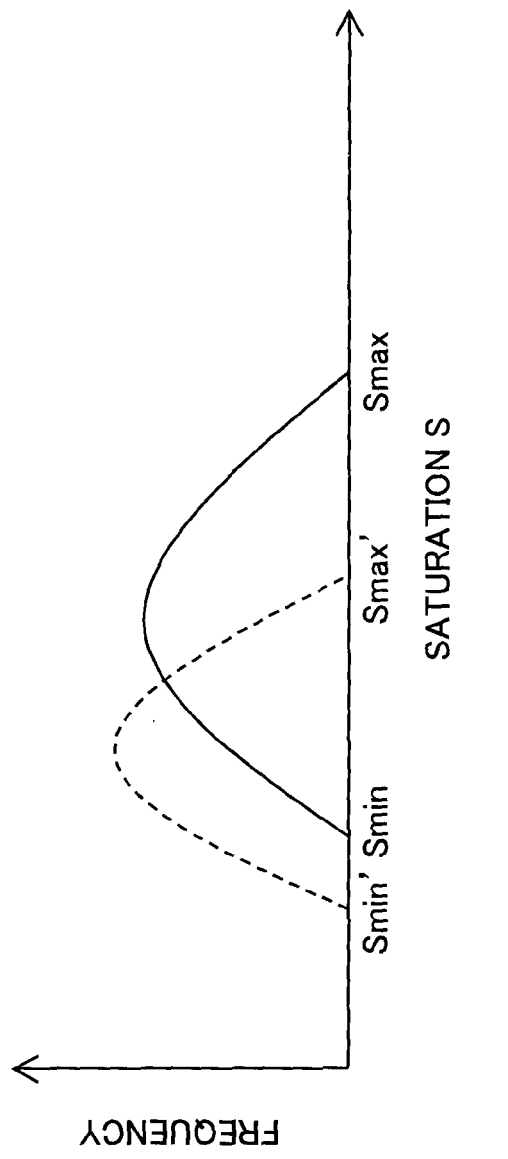
FIGS. 10A and 10B are diagrams showing changes of a saturation distribution by saturation conversion according to the first embodiment.

FIG. 10A shows a change of a saturation distribution by the saturation conversion in this case. In FIG. 10A, a solid line denotes the saturation histogram information before conversion, and a dotted line denotes the saturation histogram information after conversion. As shown in FIG. 10A, when the user designates the suntan level to cause the color of the skin area 302 to approach white skin (k<1), the saturation conversion lowers the overall saturation distribution.

Moreover, the saturation conversion table 902 shown in FIG. 9B is an example of the saturation conversion table when the user designates the suntan level to cause the color of the skin area 302 to approach brown skin (k≥1), and the curve of the saturation conversion table 902 has an upwardly convex shape.

Figure 10B:
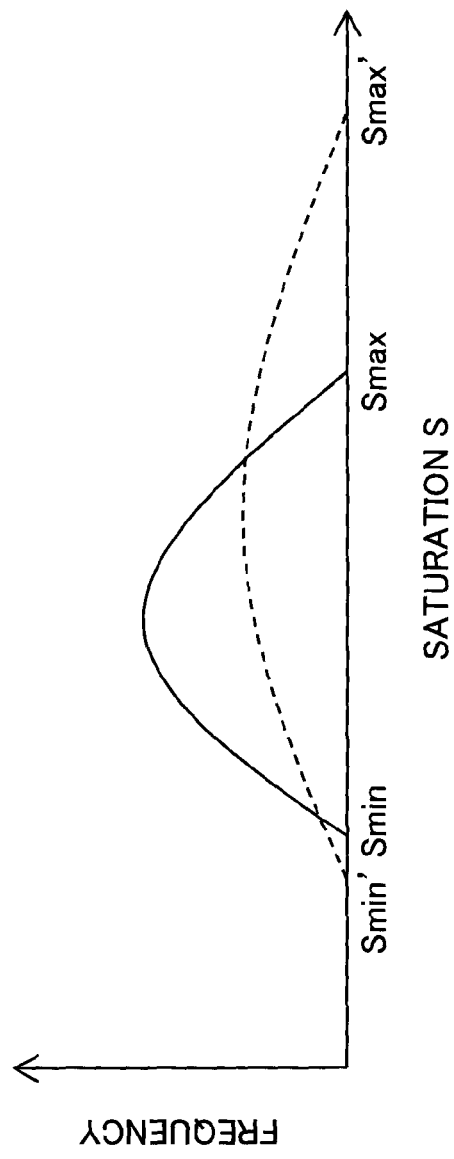

FIG. 10B shows a change of a saturation, distribution by the saturation conversion in this case. In FIG. 10A, a solid line denotes the saturation histogram information before conversion, and a dotted line denotes the saturation histogram information after conversion. As shown in FIG. 10B, when the user designates the suntan level to cause the color of the skin area 302 to approach brown skin (k≥1), the saturation distribution greatly changes in the higher saturation direction and slightly extends in the lower saturation direction. By this saturation conversion, the saturation on the side of higher saturation may improve, the width of the overall saturation distribution may be extended, and the effect of emphasizing the contrast of the low saturation portion and the high saturation portion may be obtained.

The saturation conversion unit 209 is configured to convert the saturations S of all the pixels which constitute the skin area 302 based on the saturation conversion table generated by using any one of the above-described methods. After the saturation conversion of the skin area 302 is performed and the image data 702 after the saturation conversion is generated by the saturation conversion unit 209, the display input unit 210 displays the image data 702 after the saturation conversion on the display unit 107 (at the upper-row right-hand portion of the screen shown in FIG. 7).

The user checks that the image data 702 after the saturation conversion displayed on the display unit 107 is a final image, and determines or adjusts again the suntan level of the skin. Hence, it is possible for the user to convert the color of the skin area 302 into a desired suntan condition by a simple operation of moving the slide bar 703 in the screen shown in FIG. 7 to designate the suntan level.

<Flow of Image Processing>

Figure 11:
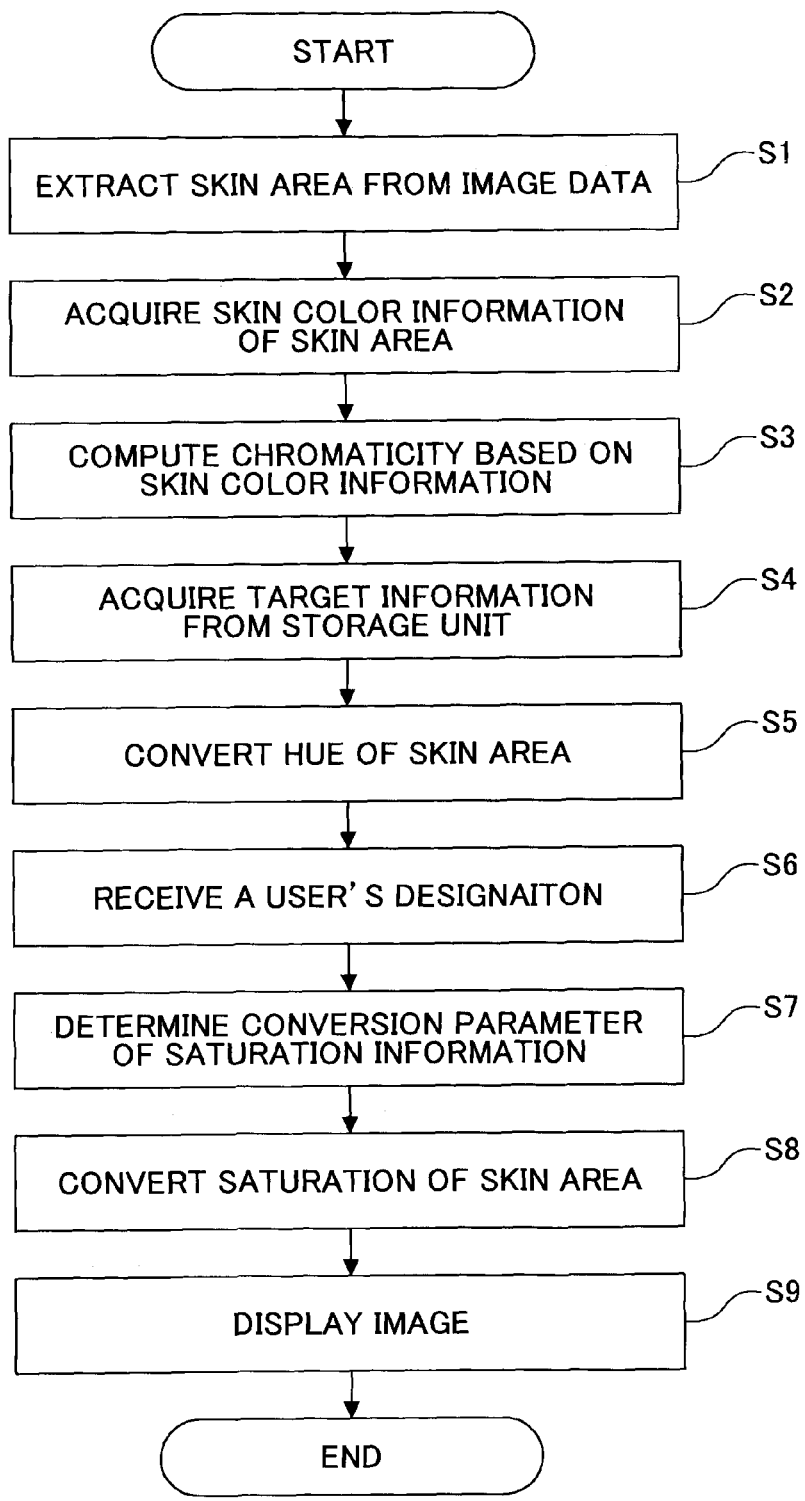
FIG. 11 is a flowchart for explaining an image processing process according to the first embodiment.

FIG. 11 is a flowchart for explaining an image processing process according to the first embodiment.

As shown in FIG. 11, when image data indicating a portrait image (including a person) which is an object of the image processing is input to the image processing apparatus 100, the skin area extraction unit 201 extracts the skin area 302 from the input image data 301 at step S1. Next, at step S2, the skin color information acquisition unit 202 acquires the skin color information of all the pixels which constitute the extracted skin area 302.

At step S3, the chromaticity computation unit 203 computes the chromaticity of all the pixels which constitute the skin area 302 based on the skin color information, and acquires the hue histogram information 401 and the saturation histogram information 402.

At step S4, the target information acquisition unit 205 acquires the target hue histogram information as the target information 501 from the storage unit 204.

At step S5, the hue conversion unit 206 converts the hues of all the pixels which constitute the skin area 302 based on the hue conversion table 603 which is generated based on the hue histogram information 401 and the target information 501.

At step S6, the display input unit 210 is controlled to display on the display unit 107 the input image data 301 and the slide bar 703 for designating a suntan level, and the reception unit 207 receives a user's designation of the suntan level via the slide bar 703.

At step S7, the parameter determination unit 208 determines a saturation conversion parameter based on the suntan level designated by the user.

At step S8, the saturation conversion unit 209 converts the saturations of all the pixels which constitute the skin area 302 based on the saturation conversion table which is generated based on the saturation conversion parameter.

It is desirable that the conversion of the saturations of the skin area 302 is performed by the saturation conversion unit 209 after the hues thereof are converted by the hue conversion unit 206. Generally, in many cases, the color tone of the skin area 302 of the input image data 301 which is obtained with a digital camera or the like may deviate from a desired skin color due to the influences of reflected light rays from a light source and the environment thereof at a time of photographing. If the conversion of the saturations is performed without performing the conversion of the hues, the initial hues of the skin area 302 may remain unchanged and a sense of incongruity in the color tone of the skin area may be left.

Thus, it is desirable that the hue conversion is performed before the saturation conversion of the skin area 302 so that the color tone of the skin area 302 is converted to a desired skin color. Performing the hue conversion in advance will enable the user to easily imagine a final target image.

At step S9, the display input unit 210 is controlled to display, on the display unit 107, the image data 702 after the saturation conversion on which the saturation conversion process has been performed by the saturation conversion unit 209, as a final image. When the suntan level is determined by the user who has visually checked the image data 702 after the saturation conversion, the image processing apparatus 100 outputs the image data which is obtained by the image processing, and terminates the image processing process. When the user wishes to redo the adjustment of the suntan level, the image processing process starting from step S6 may be performed again.

In the foregoing embodiment, each of the above-described functions of the image processing apparatus 100 according to the present invention may be implemented by executing the program, read from the main memory unit 102 (or the ROM) and loaded to the main memory unit 102 (or the RAM), by the processor (or the CPU) of the image processing apparatus 100. The program executed by the processor of the image processing apparatus 100 is configured to include multiple modules including the program for implementing each of the skin area extraction unit 201, the skin color information acquisition unit 202, the chromaticity computation unit 203, the target information acquisition unit 205, the hue conversion unit 206, the parameter determination unit 208, the saturation conversion unit 209, etc.

Moreover, the program executed by the processor of the image processing apparatus 100 according to the foregoing embodiment may be stored in an installable-form or executable-form file on a computer readable recording medium, such as CD-ROM, FD, CD-R, DVD, etc., and the computer readable recording medium storing the program may be offered.

Furthermore, the program executed by the processor of the image processing apparatus 100 according to the foregoing embodiment may be stored on a computer connected to a network, such as the Internet, and the stored program may be downloaded to another computer via the network. In addition, the program executed by the processor of the image processing apparatus 100 according to the foregoing embodiment may also be offered or distributed via the network, such as the Internet.

As described above, the image processing apparatus 100 according to the first embodiment extracts the skin area 302 from the input image data 301 which is input by the user, and converts the hue of the skin area 302 based on the target information so that a desired skin color may be reproduced. Moreover, the image processing apparatus 100 according to the first embodiment converts the saturation of the skin area 302 based on the suntan level of the skin designated by the user, so that the user's desired skin color may be reproduced with ease. Thus, even if the user is unfamiliar with image processing, it is possible for the user to convert a skin color of a portrait image into a desired skin color without fail by simple operation. It is possible to reproduce a desired skin color expression with ease.

The image processing apparatus 100 according to the foregoing embodiment may be applied to various apparatuses, such as MFPs (multifunction peripherals), copiers, printers, facsimile machines, scanners, digital cameras, PCs (personal computers), etc.

Second Embodiment

Next, a second embodiment of the present invention will be described with reference to the accompanying drawings. In the following, the composition and processing of an image processing apparatus according to the second embodiment which are essentially the same as those of the image processing apparatus 100 according to the first embodiment may be omitted.

Figure 12:
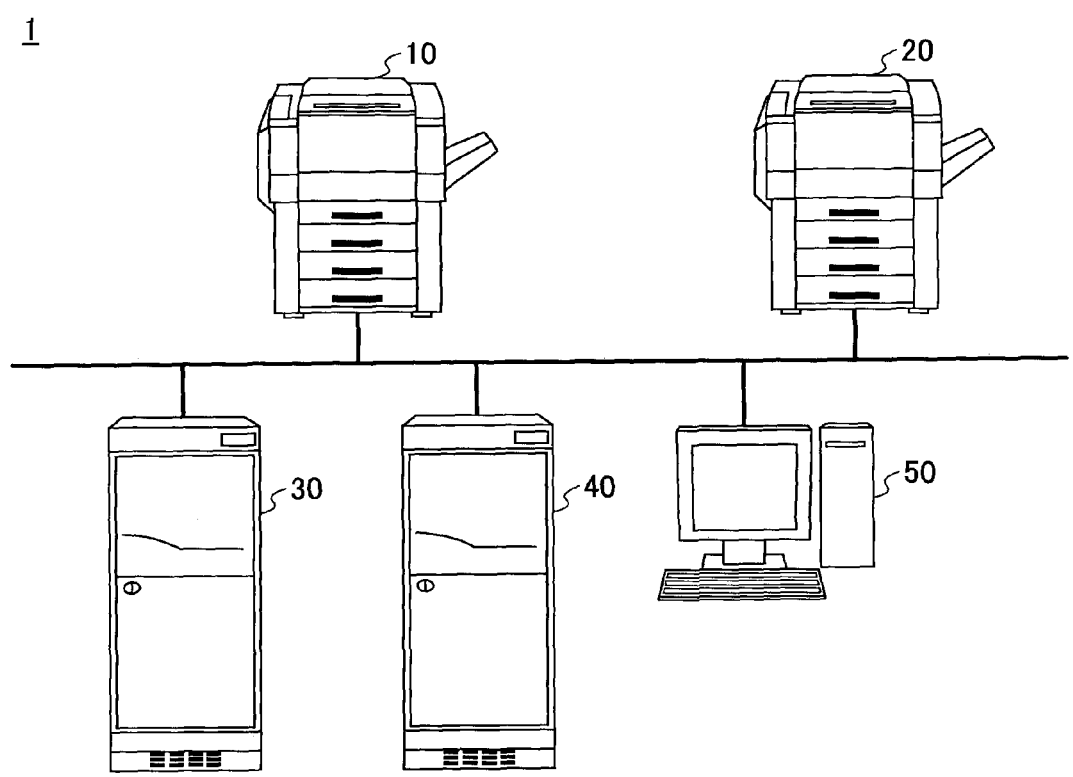
FIG. 12 is a diagram showing a configuration of an image processing system according to a second embodiment.

FIG. 12 shows a configuration of an image processing system 1 according to the second embodiment.

As shown in FIG. 12, the image processing system 1 includes MFPs (multifunction peripherals) 10 and 20, image processing servers 30 and 40, and an information processing terminal (e.g., a PC (personal computer)) 50 which are interconnected via a network.

The MFPs 10 and 20 are examples of an image input apparatus. Each of the MFPs 10 and 20 is a multifunction peripheral having multiple functions including a printer function, a scanner function, a copier function, a facsimile function, etc., which are incorporated in a single housing. The MFP 10 generates image data from a paper medium by scanning the paper medium using the scanner function and transmits the image data to any of the image processing servers 30 and 40 and the information processing terminal 50. Moreover, the MFP 10 receives image data and prints the image data on a printing medium. Other examples of the image input apparatus which is configured to input image data may include scanners, facsimile machines, copiers, etc.

The image processing servers 30 and 40 are implemented by computers, such as workstations, which receive the image data scanned and generated by the MFPs 10 and 20, or the image data transmitted from the information processing terminal 50, and perform various image processing functions. Each of the image processing servers 30 and 40 functions as an image processing apparatus which performs image processing on the input image data.

Alternatively, a part or all of functions provided by the image processing server 30 or 40 as the image processing apparatus may be installed in any of the MFPs 10 and 20 and the information processing terminal 50. Alternatively, the number of MFPs, the number of image processing servers, and the number of information processing terminals which are included in the image processing system 1 and interconnected via the network may be arbitrary.

Figure 13:
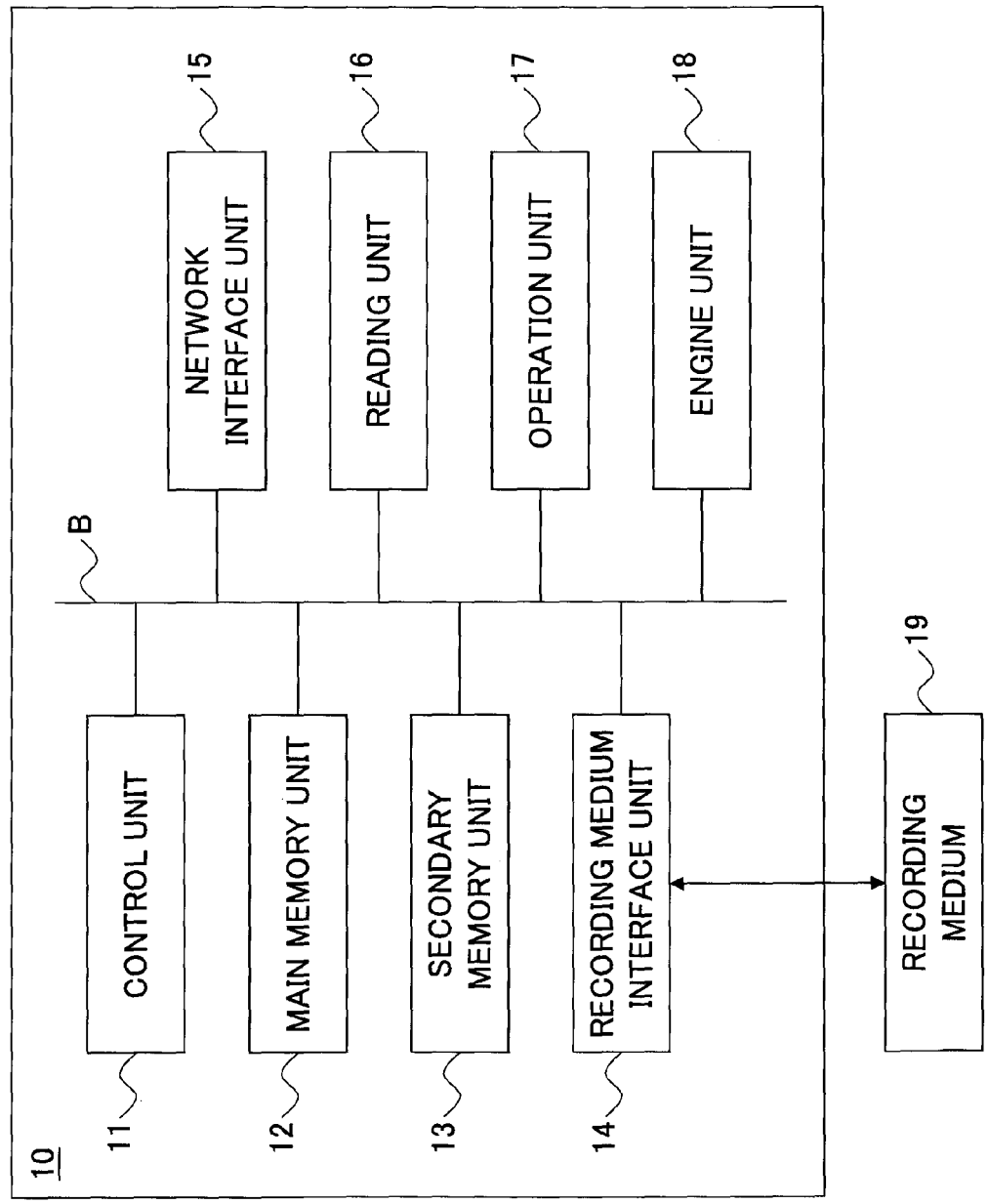
FIG. 13 is a diagram showing a hardware configuration of an image processing apparatus according to the second embodiment.

FIG. 13 shows a hardware configuration of the MFP 10. It should be noted that the MFP 20 has a hardware configuration which is the same as that of the MFP 10 and a description of the hardware configuration of the MFP 20 will be omitted.

As shown in FIG. 13, the MFP 10 includes a control unit 11, a main memory unit 12, a secondary memory unit 13, a recording medium interface unit 14, a network interface unit 15, a reading unit 16, an operation unit 17, and an engine unit 18, which are interconnected by a bus B.

The control unit 11 may include a CPU which performs control of the respective units of the MFP 10 and performs computation and processing of data. The control unit 11 may include a processor which executes a program stored in the main memory unit 12, and the processor receives data from an input device or a storage unit, performs computation and processing of the data, and outputs the processed data to an output unit or a storage unit.

The main memory unit 12 may include a ROM (read only memory), a RAM (random access memory), etc. In the main memory unit 12, an OS (operating system) as the basic software executed by the control unit 11, application programs and data are stored or temporarily retained.

The secondary memory unit 13 may include a HDD (hard disk drive) or the like. In the secondary memory unit 13, data relevant to the application programs and others are stored.

The recording medium interface unit 14 provides an interface between a recording medium 19, such as a flash memory, and the MFP 10. For example, by using a data transmission line, such as USB (universal serial bus), the recording medium interface unit 14 is connected to the recording medium 19.

A predetermined program is stored in the recording medium 19, and the recording medium 19 is attached to the MFP 10. The predetermined program stored in the recording medium 19 is installed in the main memory unit 12 of the MFP 1 through the recording medium interface unit 14. After the installation, the predetermined program is read from the main memory unit 12 and executed by the control unit 11 of the MFP 10.

The network interface unit 15 provides an interface between a peripheral device and the MFP 10, the peripheral device having a communication function and being connected to the MFP 10 via a wired or wireless network which is constructed of data transmission lines, such as a LAN (local area network) or WAN (wide area network).

The reading unit 16 may include a scanner device which reads an image by scanning a paper medium and acquires image data from the read image.

The operation unit 17 may include key switches (composed of hard keys) and a LCD (liquid crystal display) having a touch panel function including software keys of a GUI (graphical user interface). The operation unit 17 may include a display unit and/or an input unit which functions as a UI (user interface) for a user to perform various, setting processes when using functions of the MFP 10.

The engine unit 18 may include a mechanical image formation unit, such as a plotter, which performs an image formation process.

Figure 14:
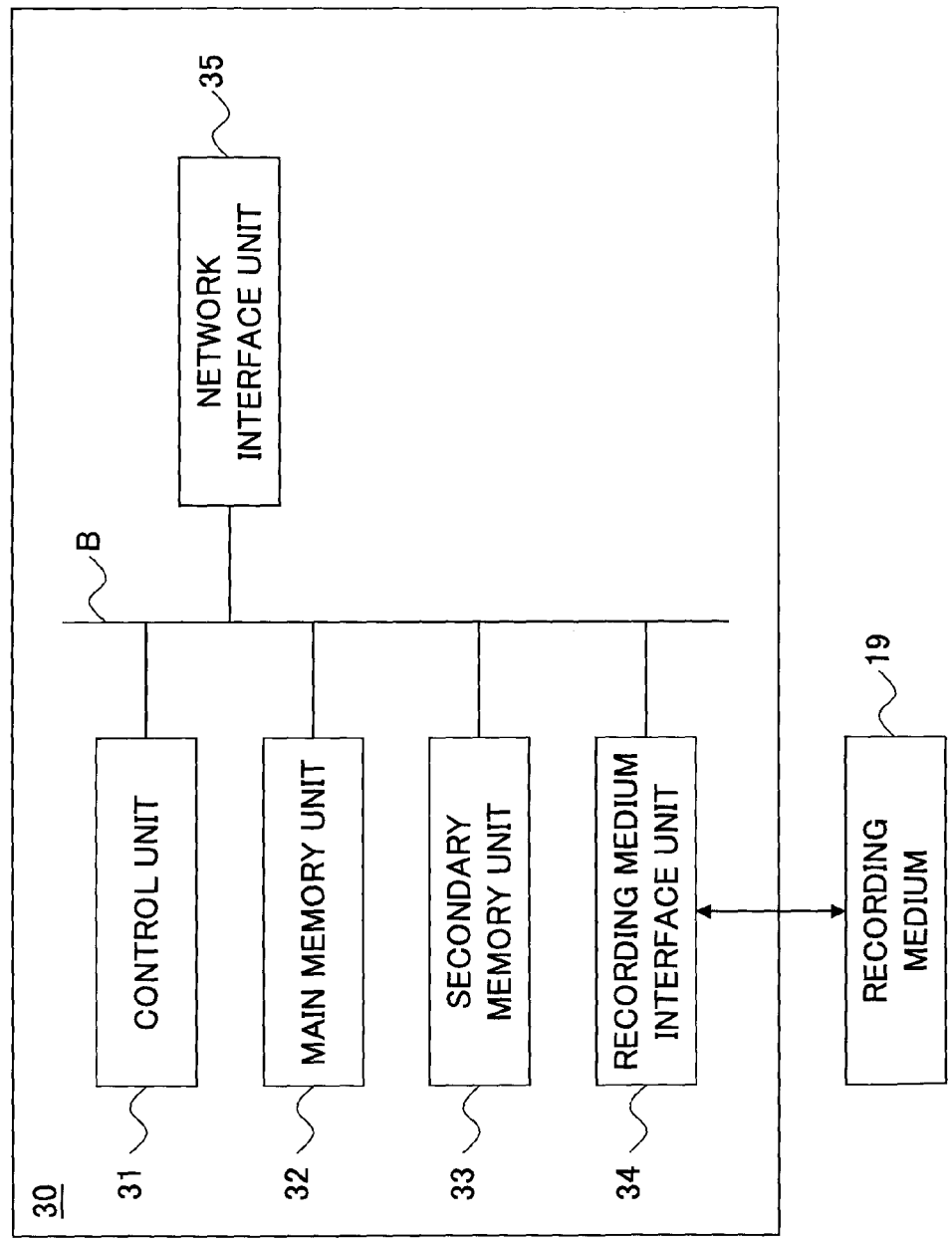
FIG. 14 is a diagram showing a hardware configuration of an image processing server according to the second embodiment.

FIG. 14 shows a hardware configuration of the image processing server 30. It should be noted that the image processing server 40 has a hardware configuration which is the same as that of the image processing server 30 and a description of the hardware configuration of the image processing server 40 will be omitted.

As shown in FIG. 14, the image processing server 30 includes a control unit 31, a main memory unit 32, a secondary memory unit 33, a recording medium interface unit 34, and a network interface unit 35.

The control unit 31 may include a CPU which performs control of the respective units of the image processing server and performs computation and processing of data. The control unit 31 may include a processor which executes a program stored in the main memory unit 32, and the processor receives data from an input device or a storage unit, performs computation and processing of the data, and outputs the processed data to an output unit or a storage unit.

The main memory unit 32 may include a ROM (read only memory), a RAM (random access memory), etc. In the main memory unit 32, an OS (operating system) as the basic software executed by the control unit 31, application programs and data are stored or temporarily retained.

The secondary memory unit 33 may include a HDD (hard disk drive) or the like. In the secondary memory unit 33, data relevant to the application programs and others are stored.

The recording medium interface unit 34 provides an interface between a recording medium 19, such as a flash memory, and the image processing server 30. For example, by using a data transmission line, such as USB (universal serial bus), the recording medium interface unit 34 is connected to the recording medium 19.

A predetermined program is stored in the recording medium 19, and the recording medium 19 is attached to the recording medium interface unit 34 of the image processing server 30. The predetermined program stored in the recording medium 19 is installed in the main memory unit 32 through the recording medium interface unit 34. After the installation, the predetermined program is read from the main memory unit 32 and executed by the control unit 31 of the image processing server 30.

The network interface unit 35 provides an interface between a peripheral device and the image processing server 30, the peripheral device having a communication function and connected to the image processing server 30 via a wired or wireless network which is constructed of data transmission lines, such as LAN (local area network) or WAN (wide area network).

In this embodiment, the image processing server 30 shown in FIG. 14 does not include an operation unit including a keyboard or the like, nor a display unit including a LCD or the like. Alternatively, the operation unit and the display unit may be included in the image processing server 30.

The information processing terminal 50 has a hardware configuration which is the same as that of the image processing apparatus 100 according to the first embodiment shown in FIG. 1.

<Functions of Image Processing System>

Figure 15:
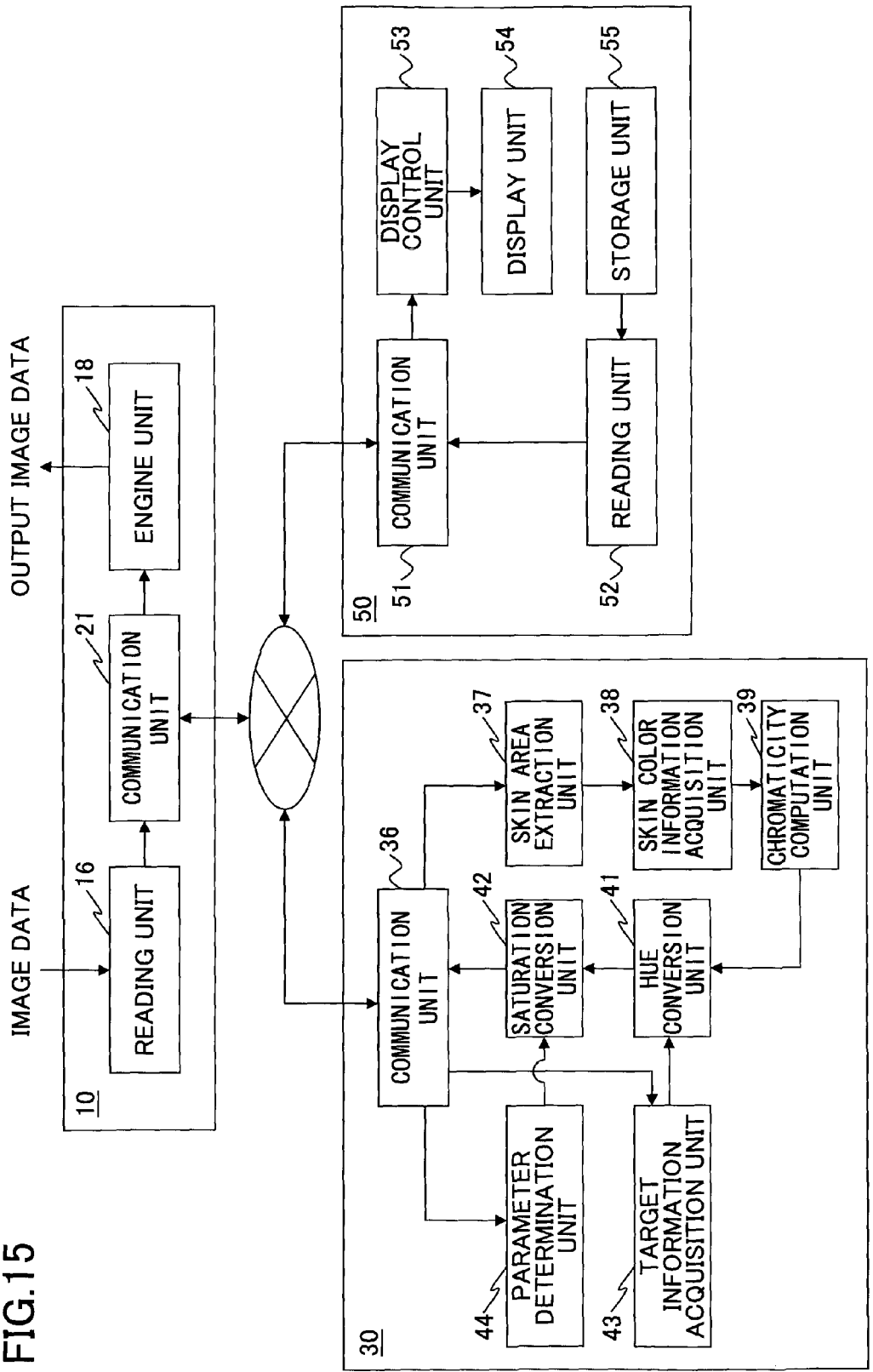
FIG. 15 is a diagram showing a functional configuration of the image processing system according to the second embodiment.

FIG. 15 shows a functional configuration of the MFP 10, the image processing server 30, and the information processing terminal 50 in the image processing system 1 according to the second embodiment. A description will be given of image processing performed by the image processing system 1 with reference to FIG. 15.

Although not illustrated in FIG. 15, the MFP 20 and the image processing server 40 have the same functional configuration as the MFP 10 and the image processing server 30, respectively. In the image processing which will be explained below, the MFP 20 and the image processing server 40 may be used instead of the MFP 10 and the image processing server 30.

As shown in FIG. 15, the MFP 10 includes the reading unit 16, a communication unit 21, and the engine unit 18.

The reading unit 16 may read an image by scanning a paper medium and acquire image data on which the image processing is to be performed. The communication unit 21 may transmit and receive image data between the image processing server 30 and the information processing terminal 50. The engine unit 18 may print and output the image data on which the image processing is performed by the image processing server 30, to a printing medium, such as a recording sheet.

The information processing terminal 50 includes a storage unit 55, a reading unit 52, a communication unit 51, a display control unit 53, and a display unit 54.

The storage unit 55 may store image data, the target information 501, etc. The reading unit 52 may read the image data and the target information 501 from the storage unit 55. The communication unit 51 may transmit and receive image data between the MFP 10 and the image processing server 30. The display control unit 53 may display the image data received by the communication unit 51 on the display unit 54. The display control unit 53 may display the image data stored in the information processing terminal 50 on the display unit 54. The display unit 54 may include any of an LCD (liquid crystal display), an organic EL (electroluminescence) display, etc. Images, operational icons, etc., are displayed on the display unit 54.

The image processing server 30 includes a communication unit 36, a skin area extraction unit 37, a skin color information acquisition unit 38, a chromaticity computation unit 39, a hue conversion unit 41, a saturation conversion unit 42, a target information acquisition unit 43, and a parameter determination unit 44.

The communication unit 36 may transmit and receive image data between the MFP 10 and the information processing terminal 50. The functions of the respective units 37-39 and 41-44 of the image processing server 30 other than the communication unit 36 are the same as those of the corresponding units of the image processing apparatus 100 according to the first embodiment, and a description thereof will be omitted.

In the above-described image processing system 1, the user may use the reading unit 16 of the MFP 10, acquire the image data on which the image processing is to be performed, send the image data to the image processing server 30, and request the image processing server 30 to perform the image processing. Or the user may read the image data on which the image processing is to be performed from the storage unit 55 of the information processing terminal 50, send the image data to the image processing server 30, and request the image processing server 30 to perform the image processing.

In the image processing server 30, the skin area extraction unit 37 may extract the skin area 302 of the input image data 301. The skin color information acquisition unit 38 may acquire the skin color information of the skin area 302. The chromaticity computation unit 39 may compute the chromaticity including at least the hue and the saturation based on the skin color information, and generate the distribution information of the chromaticity. The hue conversion unit 41 may convert the hues of the skin area 302 based on the target, information which is acquired by the target information acquisition unit 43. The saturation conversion unit 42 may convert the saturations of the skin area 302 based on the saturation conversion parameter determined by the parameter determination unit 44.

The MFP 10 may receive the image data on which the image processing is performed by the image processing server 30, and cause the engine unit 18 to print the received image data. Or the information processing terminal 50 may receive the image data on which the image processing is performed by the image processing server 30, and cause the display control unit 53 to display the received image data on the display unit 54. Hence, the user is able to get an output image in which a desired skin color expression is reproduced by requesting the MFP 10 to print it or requesting the information processing terminal 50 to display it.

As described above, in the image processing system 1 according to the second embodiment, the user is able to acquire image data on which the image processing is to be performed, by means of the MFP 10, and perform the image processing on the image data by means of the image processing server 30 or the information processing terminal 50.

Alternatively, a part of the functions of the image processing server 30 may be incorporated in the MFP 10 or the information processing terminal 50 so that the image processing may be carried out by the image processing server 30 and at least one of the MFP 10 and the information processing terminal 50.

According to the above-described embodiments, the skin area 302 is extracted from the input image data 301 input by the user and the hues of the skin area 302 are converted based on the target information 501 so that a desired skin color expression may be reproduced. Furthermore, the saturations of the skin area 302 are converted based on the suntan level of the skin designated by the user, so that a user's desired skin color expression may be reproduced. What has to be performed by the user is just to designate the suntan level of skin, and even if the user is unfamiliar with image processing, it is possible for the user to convert a skin color of a portrait image into a desired skin color without fail by simple operations. It is possible to reproduce a desired skin color expression with ease.

The image processing apparatus according to the invention is not limited to the above-described embodiments and various variations and modifications may be made without departing from the scope of the present invention.

The present application is based on and claims the benefit of priority of Japanese Patent Application No. 2014-025594, filed on Feb. 13, 2014, the entire contents of which are hereby incorporated by reference.

DESCRIPTION OF REFERENCE NUMERALS 1 image processing system
50 information processing terminal
30,100 image processing apparatus
201 skin area extraction unit
203 chromaticity computation unit
204 storage unit
206 hue conversion unit
207 reception unit
208 parameter determination unit
209 saturation conversion unit
301 input image data (image data)
302 skin area
401 hue histogram information (hue information)
402 saturation histogram information (saturation information)
501 target information
603 hue conversion table

PRIOR ART DOCUMENTS

Patent Documents

[Patent Document 1] Japanese Laid-Open Patent Publication No. 2007-158824

The invention claimed is:

1. An image processing apparatus comprising a memory storing target information items and computer readable code that, when executed by a processor, configures the processor as:
a skin area extraction unit configured to extract a skin area from image data;
a chromaticity computation unit configured to compute hue information and saturation information of pixels present in the skin area;
a hue conversion unit configured to selectively acquire one of the plurality of target information items from the memory based on a characteristic of the image data and to convert the hue information of the pixels present in the skin area to generate converted hue information that is in agreement with the acquired target information;
a reception unit configured to receive an input of a suntan level of the skin area, in which the hue information of the pixels in the skin area has been converted to agree with the acquired target information, designated by a user to change the saturation information of the pixels in the skin area;
a parameter determination unit configured to determine a conversion parameter based on the suntan level designated by the user; and
a saturation conversion unit configured to convert the saturation information of the pixels of the skin area based on the conversion parameter that has been determined from the suntan level designated by the user after the converted hue information is generated, thereby allowing adjustments to the saturation information of the pixels of the skin area while maintaining the converted hue information,
wherein the image processing apparatus further comprises a display configured to display a final image resulting from the saturation conversion performed by the saturation conversion unit.

2. The image processing apparatus according to claim 1, wherein the hue information and the target information are provided as a frequency distribution of pixels with respect to hue angles of the skin area, and the saturation information is provided as a frequency distribution of pixels with respect to saturations of the skin area.

3. The image processing apparatus according to claim 2, wherein the hue conversion unit is configured to convert hues of pixels of the skin area based on a hue conversion table which is generated based on the hue information and the target information.

4. The image processing apparatus according to claim 1, wherein the target information is determined based on subjective evaluation results obtained using a plurality of sets of sample image data.

5. An image processing system including an image processing apparatus and an information processing terminal which are connected to each other, comprising a memory storing target information items and computer readable code that, when executed by a processor, configures the processor as:
a skin area extraction unit configured to extract a skin area from image data;
a chromaticity computation unit configured to compute hue information and saturation information of pixels present in the skin area;
a hue conversion unit configured to selectively acquire one of the plurality of target information items from the memory based on a characteristic of the image data and to convert the hue information of the pixels present in the skin area to generate converted hue information that is in agreement with the acquired target information;
a reception unit configured to receive an input of a suntan level of the skin area, in which the hue information of the pixels in the skin area has been converted to agree with the acquired target information, designated by a user to change the saturation information of the pixels in the skin area;
a parameter determination unit configured to determine a conversion parameter based on the suntan level designated by the user; and
a saturation conversion unit configured to convert the saturation information of the pixels of the skin area based on the conversion parameter that has been determined from the suntan level designated by the user after the converted hue information is generated, thereby allowing adjustments to the saturation information of the pixels of the skin area while A maintaining the converted hue information,
wherein the image processing system further includes a display configured to display a final image resulting from the saturation conversion performed by the saturation conversion unit.

6. An image processing method comprising:

a skin area extraction step of extracting a skin area from image data;

a chromaticity computation step of computing hue information and saturation information of pixels present in the skin area;

an acquisition step of selectively acquiring, based on a characteristic of the image data, one of a plurality of target information items stored in a memory;

a hue conversion step of converting the hue information of the pixels present in the skin area to generate converted hue information that is in agreement with the acquired target information;

a reception step of receiving an input of a suntan level of the skin area, in which the hue information of the pixels in the skin area has been converted to agree with the acquired target information, designated by a user to change the saturation information of the pixels in the skin area;

a parameter determination step of determining a conversion parameter based on the A suntan level designated by the user;

a saturation conversion step of converting the saturation information of the pixels of the skin area based on the conversion parameter that has been determined from the suntan level designated by the user after the converted hue information is generated, thereby allowing adjustments to the saturation information of the pixels of the skin area while maintaining the A converted hue information; and a display step of displaying a final image resulting from the saturation conversion performed by the saturation conversion step.

7. A non-transitory computer-readable recording medium storing a program representing computer readable code that, when executed by a computer, causes the computer to perform the image processing method according to claim 6.

* * * * *